US012761238B2

(12) United States Patent
Nakahira et al.

(10) Patent No.: US 12,761,238 B2
(45) Date of Patent: Oct. 13, 2026

(54) FLOW VELOCITY SENSOR AND FLOW VELOCITY DETECTION METHOD

(71) Applicant: KUBOTA CORPORATION, Osaka (JP)

(72) Inventors: Yu Nakahira, Sakai (JP); Takayuki Tsukahara, Amagasaki (JP); Masaru Morimura, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 261 days.

(21) Appl. No.: 18/645,483

(22) Filed: Apr. 25, 2024

(65) Prior Publication Data

US 2024/0272194 A1 Aug. 15, 2024

Related U.S. Application Data

(63) Continuation of application No. PCT/JP2022/041068, filed on Nov. 2, 2022.

(30) Foreign Application Priority Data

Nov. 11, 2021 (JP) ................................. 2021-183776

(51) Int. Cl.
*G01P 5/04* (2006.01)

(52) U.S. Cl.
CPC ...................................... *G01P 5/04* (2013.01)

(58) Field of Classification Search
CPC ............................... G01F 1/20-30; G01P 5/04
See application file for complete search history.

(56) References Cited

U.S. PATENT DOCUMENTS 5,131,265 A * 7/1992 Tobin .................. B29C 45/7646 73/54.23
2007/0295104 A1* 12/2007 Ellegood ................... G01F 1/28 73/861.79

(Continued)

FOREIGN PATENT DOCUMENTS

DE 102014013212 A1 * 3/2016 ............... G01F 1/28
JP S5761562 U 4/1982

(Continued)

OTHER PUBLICATIONS

English Translation of DE-102014013212-A1 (Year: 2016).*

(Continued)

*Primary Examiner* — Alexander A Mercado
(74) *Attorney, Agent, or Firm* — Keating & Bennett, LLP

(57) ABSTRACT

A flow velocity sensor to detect a flow velocity of water in a water pipe includes a detector including a main body that is deformable by receiving pressure of a fluid, and a sensor to detect a deformation amount of the main body, in which the main body includes a deformation portion provided with the sensor and a pressure receiving portion to receive pressure of the fluid and deform the deformation portion, the detector includes a high sensitivity detector and a low sensitivity detector, and a ratio of a pressure receiving area of the pressure receiving portion of the high sensitivity detector to a rigidity of the deformation portion of the high sensitivity detector is larger than a ratio of a pressure receiving area of the pressure receiving portion of the low sensitivity detector to a rigidity of the deformation portion of the low sensitivity detector.

4 Claims, 10 Drawing Sheets

(56) References Cited

U.S. PATENT DOCUMENTS

| | | | | |
|---|---|---|---|---|
| 2008/0088819 A1* | 4/2008 | Metzger | .................... | G01F 1/28<br>356/28 |
| 2024/0118304 A1* | 4/2024 | Piccione | .................. | G01P 5/04 |

FOREIGN PATENT DOCUMENTS

| | | | |
|---|---|---|---|
| JP | 01-150859 | A | 6/1989 |
| JP | H07286873 | A | 10/1995 |
| JP | 08-114617 | | 5/1996 |
| JP | H09105653 | A | 4/1997 |
| JP | 3325687 | B2 | 9/2002 |
| JP | 2006-023240 | A | 1/2006 |
| JP | 2017003422 | A | 1/2017 |
| JP | 2017156204 | A | 9/2017 |

OTHER PUBLICATIONS

English Translation of Jp H07-286873 (Year: 1995).*
Official Communication issued in corresponding European Patent Application No. 22892693.7, mailed on Sep. 24, 2025, 9 pages.
Official Communication issued in International Patent Application No. PCT/JP2022/041068, mailed on Jan. 17, 2023.

* cited by examiner

FLOW VELOCITY SENSOR AND FLOW VELOCITY DETECTION METHOD

CROSS REFERENCE TO RELATED APPLICATIONS

This application claims the benefit of priority to Japanese Patent Application No. 2021-183776 filed on Nov. 11, 2021 and is a Continuation Application of PCT Application No. PCT/JP2022/041068 filed on Nov. 2, 2022. The entire contents of each application are hereby incorporated herein by reference.

BACKGROUND OF THE INVENTION

1. Field of the Invention

The present invention relates to techniques of flow velocity sensors that detect flow velocities of fluids in pipes and flow velocity detection methods using the flow velocity sensors.

2. Description of the Related Art

Conventionally, a technique to detect a flow velocity of a fluid in a water pipe is known. For example, JP H1-150859 A discloses a method of measuring a flow rate (flow velocity) in a water pipe using a flexible detection plate. A strain gauge is provided on a surface of the detection plate. The strain gauge detects deflection of the detection plate due to being pressed by the fluid in the water pipe, and measures the flow rate in the water pipe based on a value of the detection.

In the configuration in which the flow rate in the water pipe is measured using such a detection plate, when the detection plate is relatively easily deformed in order to accurately detect a flow velocity at a low flow velocity, the detection plate may be plastically deformed by a pressure of the fluid. Therefore, it is considered that it is difficult to detect a flow velocity at a high flow velocity. Furthermore, when the rigidity of the detection plate is large in order to detect the flow velocity at a high flow velocity, the detection plate becomes difficult to bend, and thus it is considered that it is difficult to detect the flow velocity at a low flow velocity. Therefore, there is a concern that a detectable flow velocity range of a fluid is narrowed.

SUMMARY OF THE INVENTION

Example embodiments of the present invention provide flow velocity sensors and flow velocity detection methods capable of detecting flow velocity of fluids in wide flow velocity ranges.

A flow velocity sensor according to one aspect of the present disclosure is a flow velocity sensor that detects a flow velocity of a fluid in a pipe, the flow velocity sensor including a detector including a main body that is deformable by receiving pressure of the fluid, and a sensor to detect a deformation amount of the main body, in which the main body includes a deformation portion provided with the sensor, and a pressure receiving portion that receives pressure of the fluid and deforms the deformation portion, the detector includes a high sensitivity detector and a low sensitivity detector, and a ratio of a pressure receiving area of the pressure receiving portion of the high sensitivity detector to a rigidity of the deformation portion of the high sensitivity detector is larger than a ratio of a pressure receiving area of the pressure receiving portion of the low sensitivity detector to a rigidity of the deformation portion of the low sensitivity detector.

Furthermore, the main body of the high sensitivity detector and the main body of the low sensitivity detector each have a plate shape and are disposed side by side in a plate surface direction.

Furthermore, a pair of the high sensitivity detectors is disposed so as to sandwich the low sensitivity detector in a flowing direction of the fluid, and a predetermined gap is provided between each of the high sensitivity detectors and the low sensitivity detector.

Furthermore, using the flow velocity sensor according to one aspect of an example embodiment of the present disclosure, a flow velocity detection method of detecting a flow velocity of the fluid based on a detection result by the sensor includes correcting a detection result by the sensor of the high sensitivity detector with a detection result by the sensor of the low sensitivity detector to detect a flow velocity of the fluid.

As an effect of one aspect of an example embodiment of the present disclosure, the following effects are obtained.

According to a flow velocity sensor according to one aspect of an example embodiment of the present disclosure, the flow velocity of the fluid can be detected in a wide flow velocity range.

Furthermore, according to a flow velocity sensor according to one aspect of an example embodiment of the present disclosure, the flow velocity sensor can be downsized.

Furthermore, according to a flow velocity sensor according to one aspect of an example embodiment of the present disclosure, it is possible to reduce or prevent plastic deformation of the high sensitivity detector.

Furthermore, according to a flow velocity detection method according to one aspect of an example embodiment of the present disclosure, the flow velocity of the fluid can be accurately detected.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
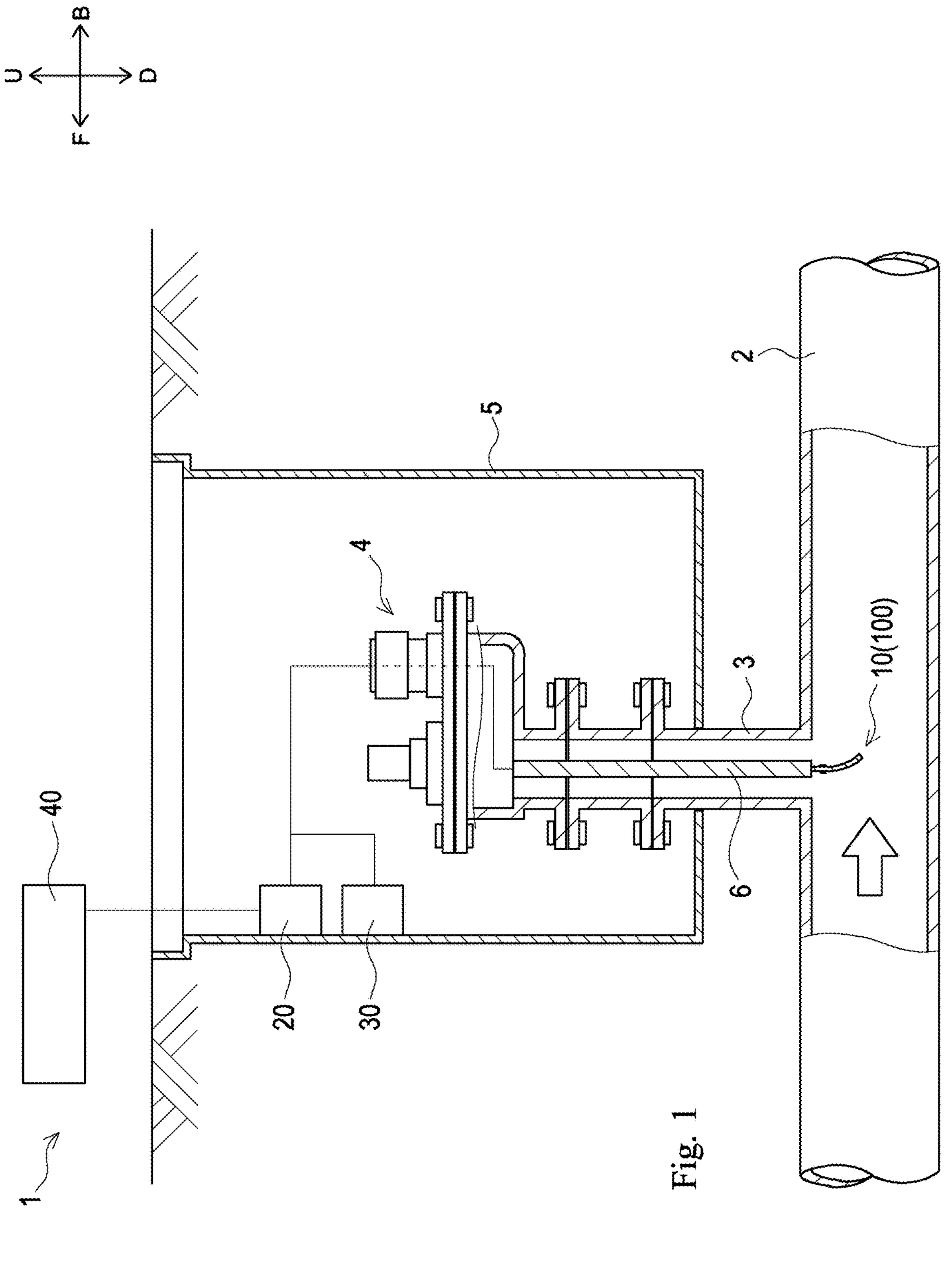
FIG. 1 is a partial cross-sectional side view of a management system.

In the following description, directions indicated by an arrow U, an arrow D, an arrow F, and an arrow B in the drawings are defined as an upward direction, a downward direction, a forward direction, and a backward direction, respectively. Note that the drawings used in the following description are schematic views, and shapes, dimensions, and the like of each structure are appropriately exaggerated for convenience of description. Therefore, specific shapes, dimensions, and the like of each structure are not limited to those illustrated in the drawings.

Hereinafter, a management system 1 using a flow velocity sensor 10 according to an example embodiment of the present invention will be described with reference to FIG. 1.

The management system 1 manages a fluid in a flow path using the flow velocity sensor 10. More specifically, the management system 1 can acquire and confirm a flow velocity of water flowing in a water pipe 2 (flow path). In the following description, it is assumed that water in the water pipe 2 flows from the front to the rear.

The management system 1 acquires a flow velocity of water through a branch portion 3 that is a flow path branched upward in a middle portion of the water pipe 2 buried in the ground. An upper portion of the branch portion 3 is connected to a fire hydrant 4 in a fire hydrant box 5. The fire hydrant box 5 is embedded so as to be located above the water pipe 2. The fire hydrant box 5 is open upward. An openable and closable lid (not illustrated) is provided in the opening. The fire hydrant 4 can feed water flowing through the water pipe 2 to a feed destination such as a hose as necessary. The fire hydrant 4 includes an appropriate on-off valve. A space communicating with the branch portion 3 is inside the fire hydrant 4.

The management system 1 includes the flow velocity sensor 10, a communication module 20, a battery 30, and a server 40.

The flow velocity sensor 10 detects a flow velocity of water in the water pipe 2. Note that the configuration of the flow velocity sensor 10 will be described in detail later.

The communication module 20 is operative to exchange information between the flow velocity sensor 10 and another device (in the present example embodiment, the server 40). The communication module 20 can exchange information with the server 40 through an appropriate line. The communication module 20 is connected to the flow velocity sensor 10 through an appropriate lead wire. The communication module 20 is provided in the fire hydrant box 5.

The battery 30 serves as a power supply for the flow velocity sensor 10 and the communication module 20. The battery 30 is connected to the flow velocity sensor 10 and the communication module 20 through a lead wire. The battery 30 is provided in the fire hydrant box 5.

The server 40 appropriately performs processing in response to a request from another device. The server 40 includes an arithmetic circuit device or processor (for example, a CPU or the like), a storage device (for example, HDD or the like), and an input/output device (for example, a mouse, a keyboard, a display, and the like). The server 40 can receive a signal (signals of sensors 220 and 320 to be described later) from the flow velocity sensor 10 through the communication module 20 and acquire a detection value of the flow velocity of water in the water pipe 2 on the basis of the signal.

Furthermore, the server 40 can perform processing of correcting the detection value of the flow velocity. Note that the correction processing will be described in detail later. Furthermore, the server 40 can execute communication with an appropriate terminal (for example, a PC, a smartphone, a tablet terminal, or the like).

Hereinafter, the configuration of the flow velocity sensor 10 according to the first example embodiment of the present invention will be described in detail with reference to FIGS. 1 to 3C. As illustrated in FIG. 1, the flow velocity sensor 10 is fixed to the fire hydrant 4 through an attachment rod 6 extending vertically along the branch portion 3. An upper end portion of the attachment rod 6 is fixed inside the fire hydrant 4. A lower end portion of the attachment rod 6 is located at a connection portion between the branch portion 3 and the water pipe 2. The flow velocity sensor 10 is fixed to the lower end portion of the attachment rod 6 and is provided so as to be located in the water pipe 2. The flow velocity sensor 10 includes a detector 100.

The detector 100 illustrated in FIGS. 2 and 3A to 3C can detect a flow velocity of water with high sensitivity and low sensitivity. The detector 100 includes a high sensitivity detector 200 and a low sensitivity detector 300.

The high sensitivity detector 200 detects the flow velocity of water with relatively high sensitivity. The high sensitivity detector 200 includes a main body 210 and a sensor 220.

The main body 210 illustrated in FIGS. 2 and 3A to 3C is a portion that can be elastically deformed by receiving the pressure of water flowing in the water pipe 2. The main body 210 has a plate shape and includes a plate surface facing a flowing direction (front-rear direction) of water. The main body 210 preferably has a rectangular or substantially rectangular shape elongated vertically in a front view. A thickness dimension of the main body 210 is appropriately set from the viewpoint of detecting the flow velocity of water with high sensitivity. The main body 210 is formed of a material having flexibility. As a material of the main body 210, for example, a metal material such as stainless steel can be adopted. The main body 210 includes a fixing portion 211, a deformation portion 212, and a pressure receiving portion 213.

The fixing portion 211 is a portion fixed to the lower end portion of the attachment rod 6. The fixing portion 211 defines an upper end portion of the main body 210. A hole 211*a* through which a stopper (not illustrated) such as a bolt used for fixing is inserted is formed in the fixing portion 211. In the illustrated example, a pair of the holes 211*a* is formed on the left and right.

The deformation portion 212 is a portion where the sensor 220 to be described later is provided. The deformation portion 212 defines a portion below the fixing portion 211 in an upper portion of the main body 210. Specifically, the deformation portion 212 is a portion of the main body 210 in a range of a vertical width of the sensor 220 provided in the main body 210.

The pressure receiving portion 213 is a portion that receives the pressure of water flowing through the water pipe 2 and deforms the deformation portion 212. The pressure receiving portion 213 defines a portion of the main body 210 below the deformation portion 212. The pressure receiving portion 213 is provided so as to be inserted into the branch portion 3 and at least a lower portion thereof is located in the water pipe 2 (see FIG. 1).

The sensor 220 detects a deformation amount (strain) of the deformation portion 212. More specifically, the sensor 220 detects, as an electric signal, a deformation amount of the deformation portion 212 when the main body 210 is bent in the front-rear direction. As the sensor 220, a strain gauge can be used. The sensor 220 has a direction (measurement axis direction) in which strain can be detected oriented in the vertical direction. The sensor 220 is provided on each of a front surface and a rear surface of the deformation portion 212. The sensor 220 is connected to the communication module 20 and the battery 30 through a lead wire. Furthermore, the sensor 220 is subjected to a waterproof treatment. As the waterproof treatment, for example, coating with a protective tape or the like can be adopted.

The low sensitivity detector 300 detects the flow velocity of water with relatively low sensitivity. That is, the low sensitivity detector 300 detects the flow velocity of water with lower sensitivity than the high sensitivity detector 200. The low sensitivity detector 300 includes a main body 310 and a sensor 320. The low sensitivity detector 300 is separate from the high sensitivity detector 200. The low sensitivity detector 300 is provided on the side (left side) of the high sensitivity detector 200. Note that the configuration of the low sensitivity detector 300 is substantially similar to the configuration of the high sensitivity detector 200 except for a portion thereof. Therefore, the detailed description of the main body 310 and the sensor 320 will be appropriately omitted below.

Figure 2:
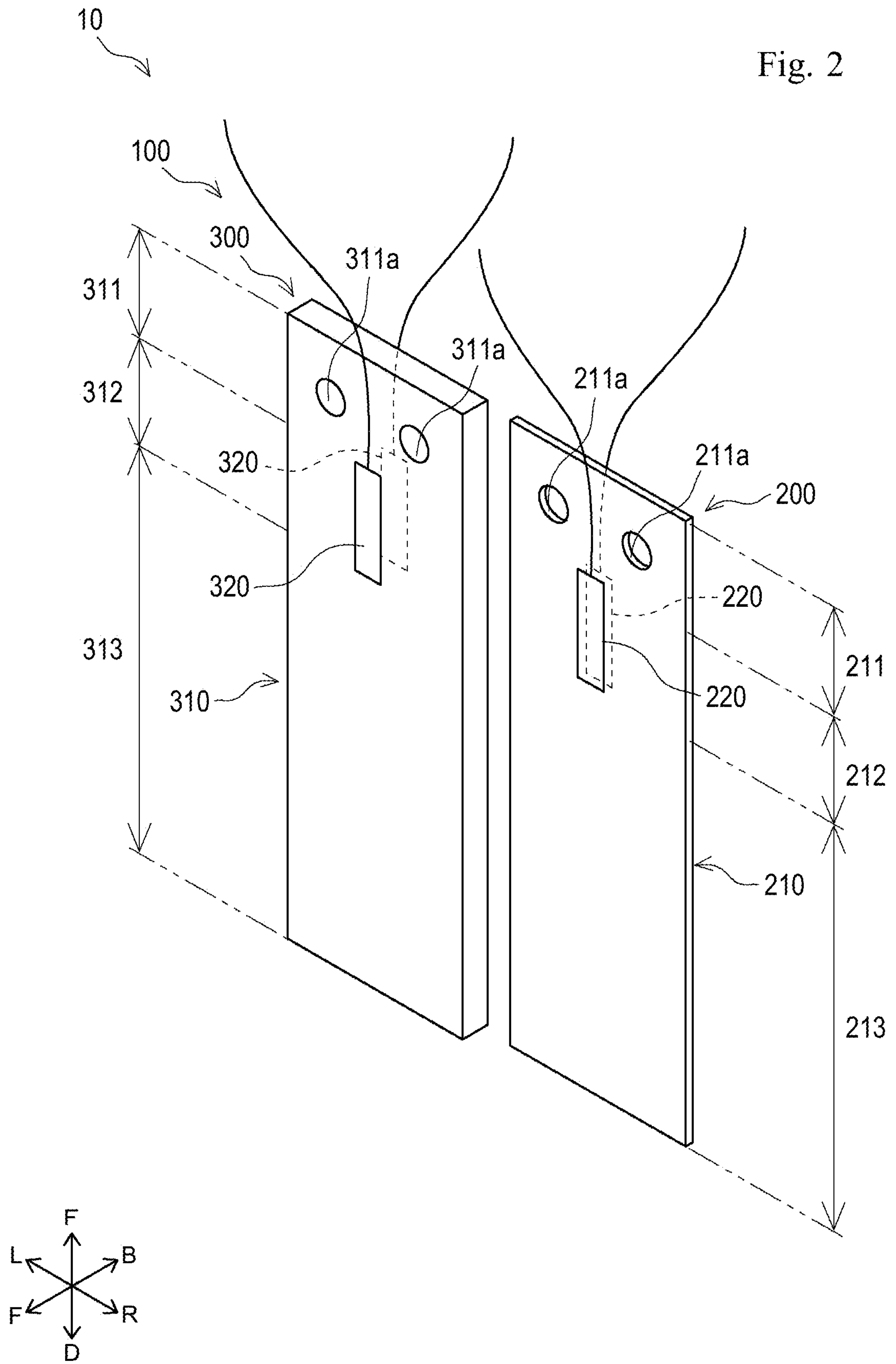
FIG. 2 is a perspective view of a flow velocity sensor according to a first example embodiment of the present invention.

The main body 310 illustrated in FIGS. 2 and 3A to 3C is a portion elastically deformable by receiving the pressure of water flowing in the water pipe 2 on the left side of the main body 210. As illustrated in FIG. 2, the main body 210 and the main body 310 are disposed side by side in the left-right direction (plate surface direction).

The main body 310 is formed in the same manner as the main body 210 except that the thickness dimension is larger than a thickness dimension of the main body 210. That is, the main body 310 has a plate shape similar to the main body 210 in other dimensions except for the thickness dimension. Therefore, an area of the main body 310 in a front view is similar to an area of the main body 210 in a front view. Note that the thickness dimension of the main body 310 is appropriately set from the viewpoint of detecting the flow velocity of water with low sensitivity.

The main body 310 includes a fixing portion 311, a deformation portion 312, and a pressure receiving portion 313. Note that the fixing portion 311 (a hole 311*a*), the deformation portion 312, and the pressure receiving portion 313 are substantially similar to the respective portions (the fixing portion 211 (hole 211*a*), the deformation portion 212, and the pressure receiving portion 213) of the main body 210.

The sensor 320 detects a deformation amount (strain) of the deformation portion 312. The sensor 320 is provided on each of a front surface and a rear surface of the deformation portion 312. The configuration of the sensor 320 is similar to that of the sensor 220 of the high sensitivity detector 200.

In the flow velocity sensor 10 as described above, the main body 210 of the high sensitivity detector 200 is more easily deformed than the main body 310 of the low sensitivity detector 300. More specifically, a ratio of a pressure receiving area of the pressure receiving portion 213 to a rigidity of the deformation portion 212 of the high sensitivity detector 200 is larger than a ratio of a pressure receiving area of the pressure receiving portion 313 to a rigidity of the deformation portion 312 of the low sensitivity detector 300. The larger the ratio of the pressure receiving area to the rigidity, the more easily the structure is deformed.

Here, the "rigidity" is a degree indicating difficulty in deformation of the structure. In the plate-shaped structures such as the main body 210 and the main body 310, the larger the thickness dimension of the structure and the width dimension (lateral dimension) of the structure, the higher the rigidity (the more hardly the deformation). As the rigidity increases, the strength of the main body 210 and the main body 310 is improved, but the amounts of change in the deformation portion 212 and the deformation portion 312 decrease, and it becomes difficult to perform the detection by the sensor 220 and the sensor 320 (sensitivity decreases). That is, the rigidity and the sensitivity are in a trade-off relationship.

Furthermore, the "pressure receiving area" is an area of a surface that receives the pressure of water flowing through the water pipe 2. In the present example embodiment, the "pressure receiving area" refers to an area of a portion of the pressure receiving portion 213 and the pressure receiving portion 313 that protrudes into the water pipe 2 in front view. As the pressure receiving area is larger, the structure is more likely to receive the pressure of water, so that the structure is more likely to be deformed. In the present example embodiment, the high sensitivity detector 200 and the low sensitivity detector 300 are disposed such that the pressure receiving portion 213 and the pressure receiving portion 313 protrude into the water pipe 2 by the same area, so that the pressure receiving portion 213 and the pressure receiving portion 313 have the same pressure receiving area.

In the present example embodiment, the thickness dimension of the main body 210 (deformation portion 212) of the high sensitivity detector 200 is smaller than the thickness dimension of the main body 310 (deformation portion 312) of the low sensitivity detector 300, and the width dimensions of the deformation portion 212 and the deformation portion 312 are the same. Therefore, the rigidity of the deformation portion 212 is smaller than the rigidity of the deformation portion 312.

Furthermore, in the present example embodiment, the pressure receiving areas of the pressure receiving portion 213 and the pressure receiving portion 313 are the same. Based on the above description, it can be said that the ratio of the pressure receiving area of the pressure receiving portion 213 to the rigidity of the deformation portion 212 of the high sensitivity detector 200 is larger than the ratio of the pressure receiving area of the pressure receiving portion 313 to the rigidity of the deformation portion 312 of the low sensitivity detector 300.

Hereinafter, a state in which the flow velocity of water flowing through the water pipe 2 is detected using the above-described flow velocity sensor 10 will be described.

Figure 3C:
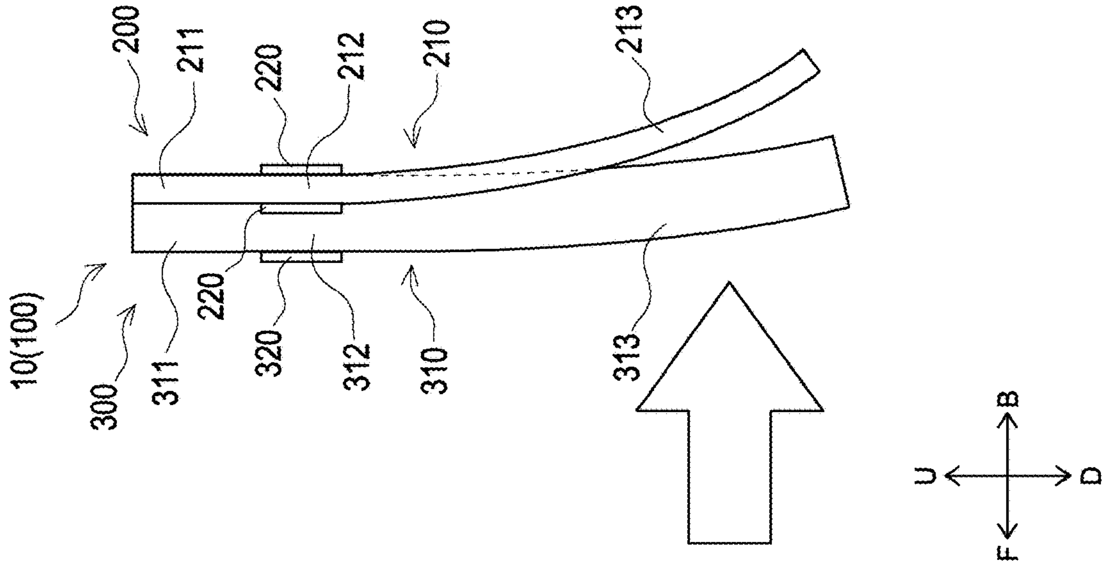
FIG. 3C is a side view illustrating a state of the flow velocity sensor in a state where the flow velocity is V2 or more.
Figure 3B:
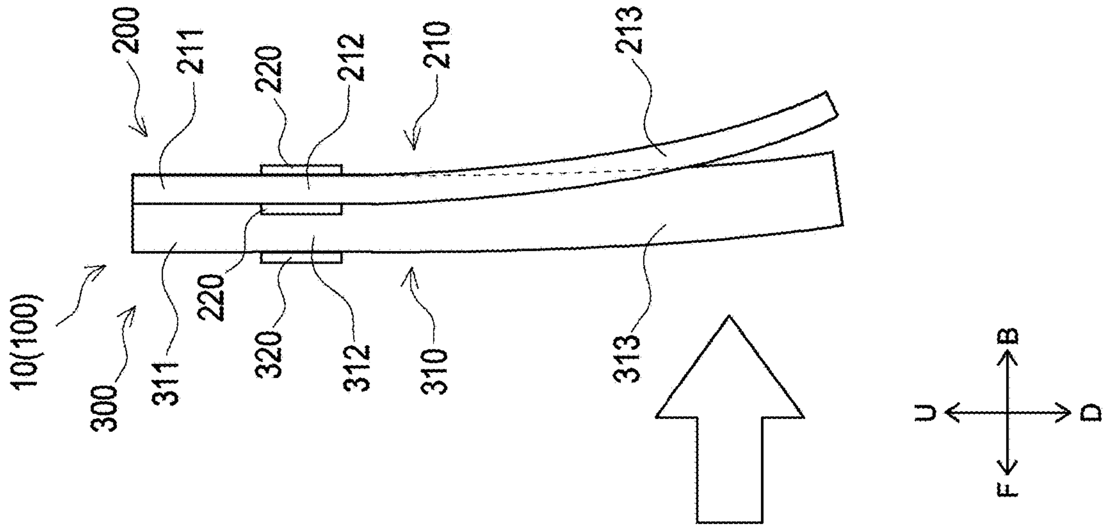
FIG. 3B is a side view illustrating a state of the flow velocity sensor in a state where the flow velocity is V1 or more and less than V2.
Figure 3A:
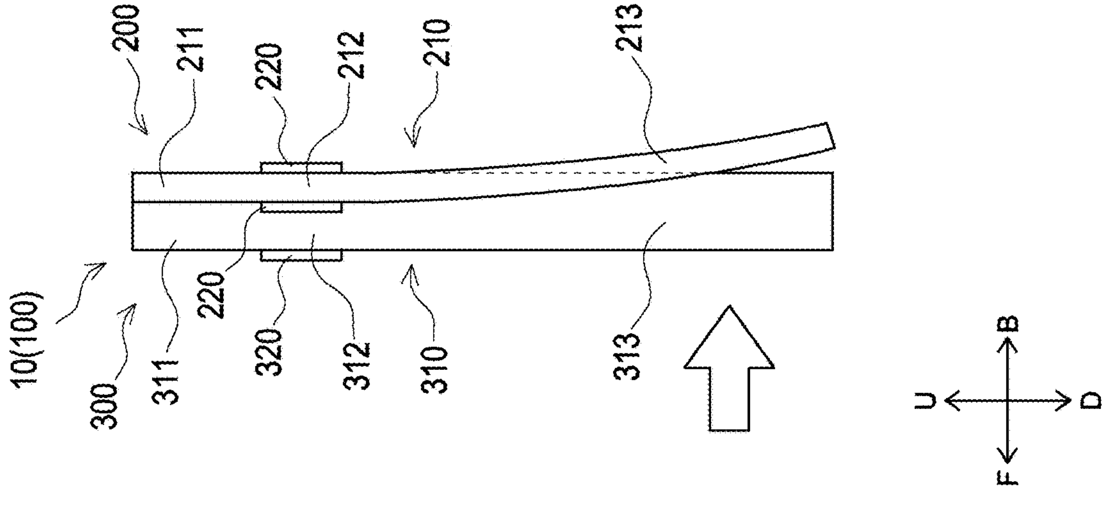
FIG. 3A is a side view illustrating a state of the flow velocity sensor in a state where the flow velocity is less than V1.

As illustrated in FIGS. 3A to 3C, in the detector 100 (the high sensitivity detector 200 and the low sensitivity detector 300) of the flow velocity sensor 10, the main body 210 and the main body 310 are deformed by receiving the pressure of water flowing in the water pipe 2. Specifically, the main body 210 and the main body 310 receive the pressure of the water flowing from the front to the rear at the front surfaces of the pressure receiving portion 213 and the pressure receiving portion 313. The sensor 220 and the sensor 320 detect the deformation amounts (strains) of the deformation portion 212 and the deformation portion 312 thus deformed.

The detection results of the sensor 220 and the sensor 320 are transmitted to the server 40 by the communication module 20. The server 40 detects the flow velocity on the basis of the detection results. For example, the server 40 detects the flow velocity by converting the deformation amounts (strains) detected by the sensor 220 and the sensor 320 on the basis of the characteristics (dimensions, rigidity, and the like) of the main body 210 and the main body 310. In this manner, the management system 1 can detect the flow velocity using the flow velocity sensor 10.

In the present example embodiment, the sensor 220 and the sensor 320 are provided on both front and back surfaces of the deformation portion 212 and the deformation portion 312. As a result, the flow velocity sensor 10 can detect both the flow velocities in the front-rear direction. The server 40 determines a direction (flow direction) in which water flows on the basis of detection values of the front and rear sensors. Furthermore, the server 40 can invalidate (cancel) the strain of each deformation portion due to a temperature change by using the detection values of the front and rear sensors.

Furthermore, the server 40 can detect the flow velocity by using a detection result suitable to detect the flow velocity among the high sensitivity detector 200 and the low sensitivity detector 300 according to the flow velocity of the water flowing through the water pipe 2.

Hereinafter, a flow velocity detection method using the flow velocity sensor 10 will be described with reference to FIGS. 3A to 3C to 6.

First, a flow velocity range that can be detected by the high sensitivity detector 200 and the low sensitivity detector 300 of the flow velocity sensor 10 will be described with reference to FIGS. 3A to 3C to 5.

Figure 4A:
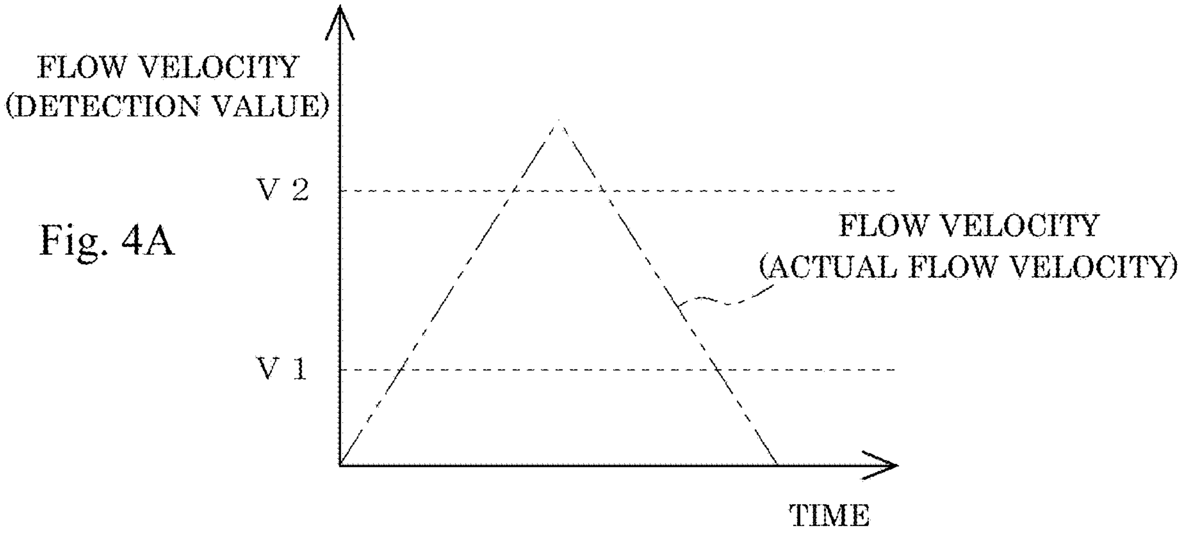
FIG. 4A is a graph illustrating a time change in an actual flow velocity.
Figure 4B:
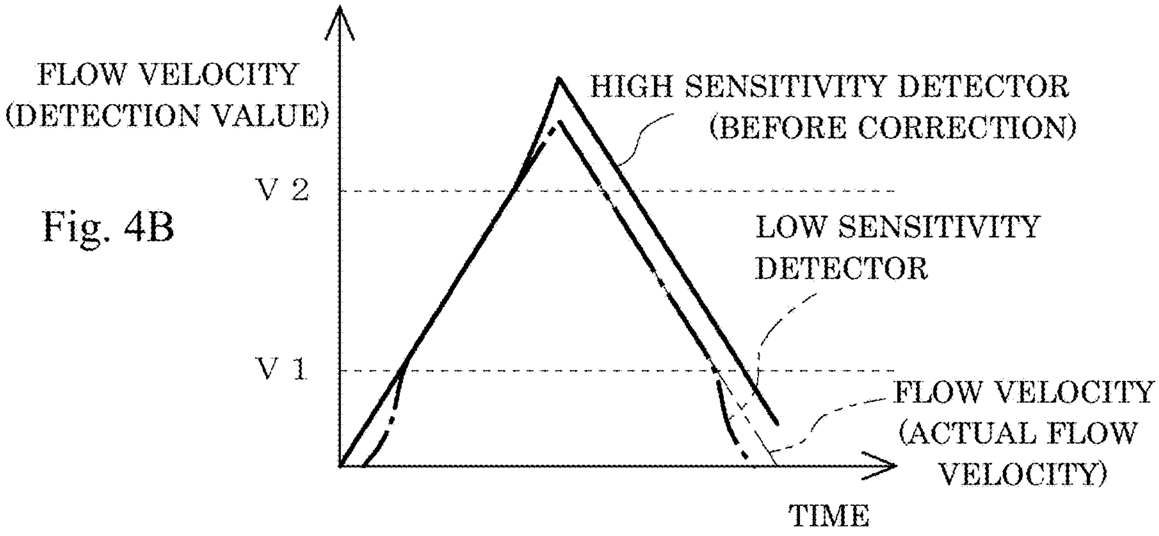
FIG. 4B is a graph illustrating a time change of a detection value of the flow velocity sensor.
Figure 4C:
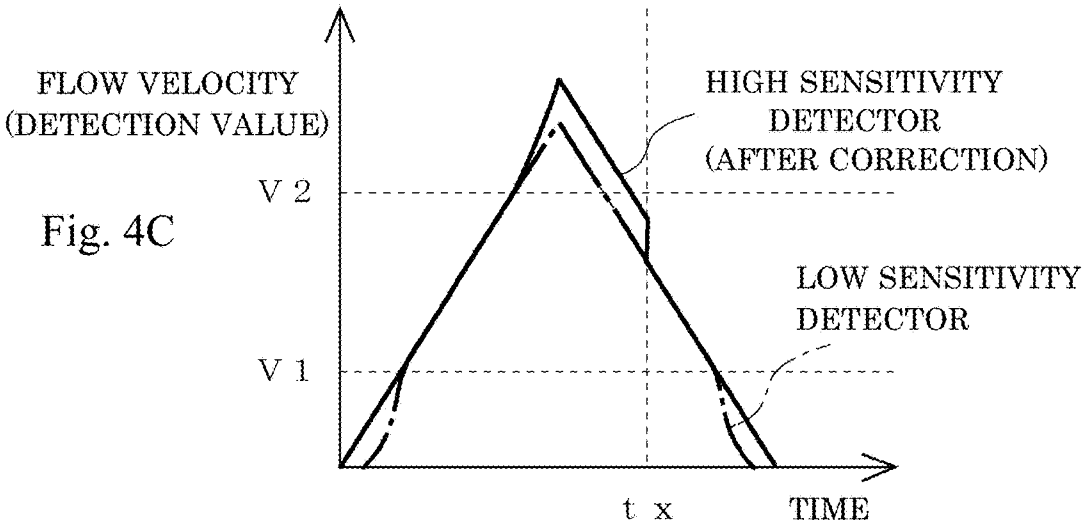
FIG. 4C is a graph illustrating an example in which a detection value of a high sensitivity detector is corrected.

The graphs illustrated in FIGS. 4A to 4C show a time change in a flow velocity of water flowing through the water pipe 2. A line indicated by a two-dot chain line in FIG. 4A indicates an actual flow velocity of water flowing through the water pipe 2. The actual flow velocity increases partway with the lapse of time, and then decreases with the lapse of time.

Lines (thick lines) indicated by a solid line and an alternate long and short dash line in FIGS. 4B and 4C indicate detection values of the flow velocity of the high sensitivity detector 200 and the low sensitivity detector 300, respectively. If the detection values of the high sensitivity detector 200 and the low sensitivity detector 300 illustrated in the above graph match the actual flow velocity, it is indicated that the detection of the flow velocity by the flow velocity sensor 10 is accurate.

Figure 5:
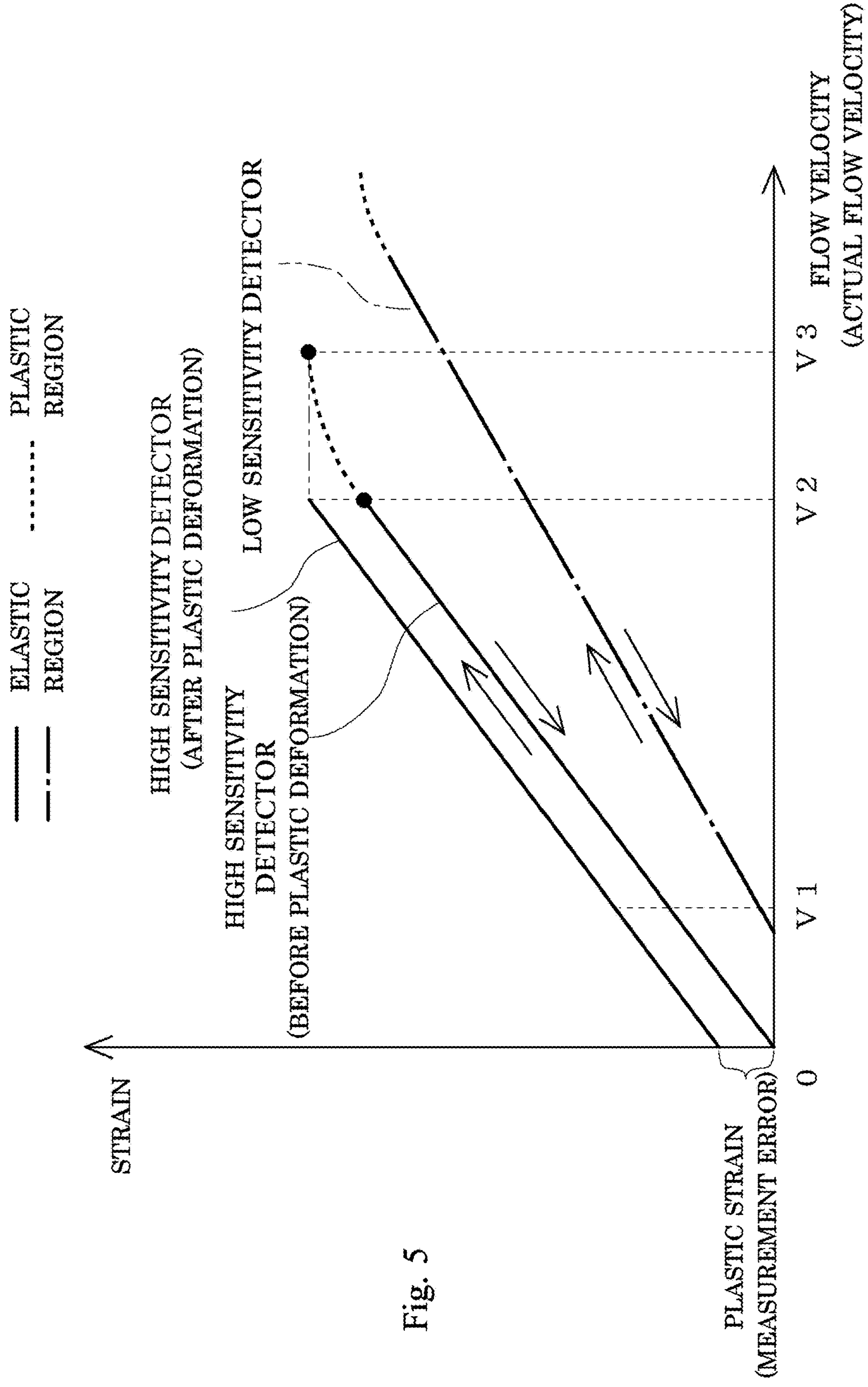
FIG. 5 is a graph illustrating a relationship between strain detected by a sensor and an actual flow velocity.

The graph illustrated in FIG. 5 shows a relationship between the detection results (strains) of the sensor 220 and the sensor 320 in the detector 100 (the high sensitivity detector 200 and the low sensitivity detector 300), and the actual flow velocity. FIG. 5 illustrates detection results of the high sensitivity detector 200 before and after plastic deformation. Note that, in FIG. 5, a range of strain (elastic region) in which the deformation portion 212 and the deformation portion 312 can be elastically deformed is indicated by a solid line and an alternate long and short dash line, and a range of strain (plastic region) exceeding the elastic region (which may cause plastic deformation) is indicated by a broken line.

FIG. 3A illustrates a case where the flow velocity of water in the water pipe 2 is a low flow velocity (for example, about 0.1 m/s). In this state, since the pressure of water is small, the deformation amount of the deformation portion 312 of the low sensitivity detector 300 is small. Therefore, it is difficult to perform detection by the sensor 320 until the flow velocity reaches a certain level. Specifically, as illustrated in FIG. 4B, the detection value of the low sensitivity detector 300 is lower than the actual flow velocity until the flow velocity becomes V1 or more. Furthermore, as illustrated in FIG. 5, the sensor 320 does not detect strain until the flow velocity becomes close to V1. That is, it is difficult for the low sensitivity detector 300 to detect a range of a flow velocity (flow velocity range) of less than V1.

On the other hand, as illustrated in FIG. 3A, the deformation amount of the deformation portion 212 of the high sensitivity detector 200 is large even in the case of a low flow velocity. Therefore, detection by the sensor 220 is easily performed. Specifically, as illustrated in FIG. 4B, the detection value of the high sensitivity detector 200 substantially matches the actual flow velocity in the flow velocity range of less than V1 (a portion where the flow velocity is increased). That is, in the flow velocity range, the high sensitivity detector 200 can accurately detect the flow velocity.

FIG. 3B illustrates a case where the flow velocity is higher than the flow velocity of FIG. 3A. In this state, the amounts of change in the deformation portion 212 and the deformation portion 312 are larger than those in a case where the flow velocity is less than V1. As illustrated in FIG. 4B, until the flow velocity becomes V2 or more, the detection values of the high sensitivity detector 200 and the low sensitivity detector 300 substantially coincide with the actual flow velocity. That is, in a flow velocity range (more specifically, in a flow velocity range of V1 or more and less than V2 in FIG. 4B, where the flow velocity increases with time) where the flow velocity is V1 or more and less than V2, both the high sensitivity detector 200 and the low sensitivity detector 300 can accurately detect the flow velocity. Note that, as illustrated in FIG. 5, in a range of less than V2, the strains of the deformation portion 212 and the deformation portion 312 are in the elastic region.

FIG. 3C illustrates a case where the flow velocity is a high flow velocity (for example, about 2.0 m/s). In this state, the amounts of change in the deformation portion 212 and the deformation portion 312 further increase. In this case, the deformation portion 212 of the high sensitivity detector 200 having low rigidity may be excessively deformed. As illustrated in FIG. 5, in a case where the flow velocity is V2 or more, the strain of the deformation portion 212 is in a plastic region, and the deformation portion 212 is deformed beyond the elastically deformable range (see also FIG. 4B). For example, in a case where the flow velocity becomes a flow velocity V3 larger than V2, the deformation portion 212 is plastically deformed. In this case, as illustrated in FIG. 4B, the detection value of the high sensitivity detector 200 exceeds the actual flow velocity. Therefore, the high sensitivity detector 200 cannot accurately detect a flow velocity range larger than V2.

On the other hand, as illustrated in FIG. 5, the deformation portion 312 of the low sensitivity detector 300 having high rigidity can be detected by the sensor 320 since the strain of the deformation portion 312 is in the elastic region even when the flow velocity becomes V3. As illustrated in FIG. 4B, the detection value of the low sensitivity detector 300 substantially matches the actual flow velocity in a flow velocity range of V2 or more. That is, in the flow velocity range, the low sensitivity detector 300 can accurately detect the flow velocity.

As described above, the flow velocity sensor 10 can detect the flow velocity of water in a wide flow velocity range by using both the high sensitivity detector 200 and the low sensitivity detector 300. That is, in a case where the flow velocity is small, the flow velocity can be detected using the high sensitivity detector 200 that is relatively easily deformed and is suitable to detect a low flow velocity. Furthermore, in a case where the flow velocity is large, the flow velocity can be detected using the low sensitivity detector 300 that is relatively hardly deformed and is suitable to detect a high flow velocity.

Here, as illustrated in FIGS. 4B and 5, in a case where the strain of the deformation portion 212 becomes a plastic region and the deformation portion 212 is plastically deformed, the high sensitivity detector 200 continues to detect a detection value larger than the actual flow velocity by a predetermined amount. That is, as illustrated in FIG. 5, the high sensitivity detector 200 continues to detect a value obtained by adding a deformation amount (plastic strain) generated by plastic deformation to an original deformation amount (deformation amount before plastic deformation) of the deformation portion 212. Therefore, as illustrated in FIG. 4B, even if the flow velocity becomes less than V2 after the deformation portion 212 is plastically deformed, it is difficult for the high sensitivity detector 200 to accurately detect the flow velocity. Furthermore, in the flow velocity range of less than V1, both the high sensitivity detector 200 and the low sensitivity detector 300 cannot detect an accurate flow velocity.

Therefore, in a case where the main body 210 of the high sensitivity detector 200 is plastically deformed, the management system 1 (server 40) can correct a detection result by the high sensitivity detector 200 using a detection result by the low sensitivity detector 300.

FIG. 4C illustrates an example in which the detection value of the high sensitivity detector 200 in which plastic deformation has occurred is corrected. In the example illustrated in FIG. 4C, by correcting an error of the detection value of the high sensitivity detector 200 at time tx, the detection value of the high sensitivity detector 200 after the time tx is substantially matched with the actual flow velocity. Note that the correction of the detection result will be described in detail later.

Next, an example in which the flow velocity is actually acquired using the flow velocity sensor 10 as described above will be described with reference to FIG. 6.

Figure 6:
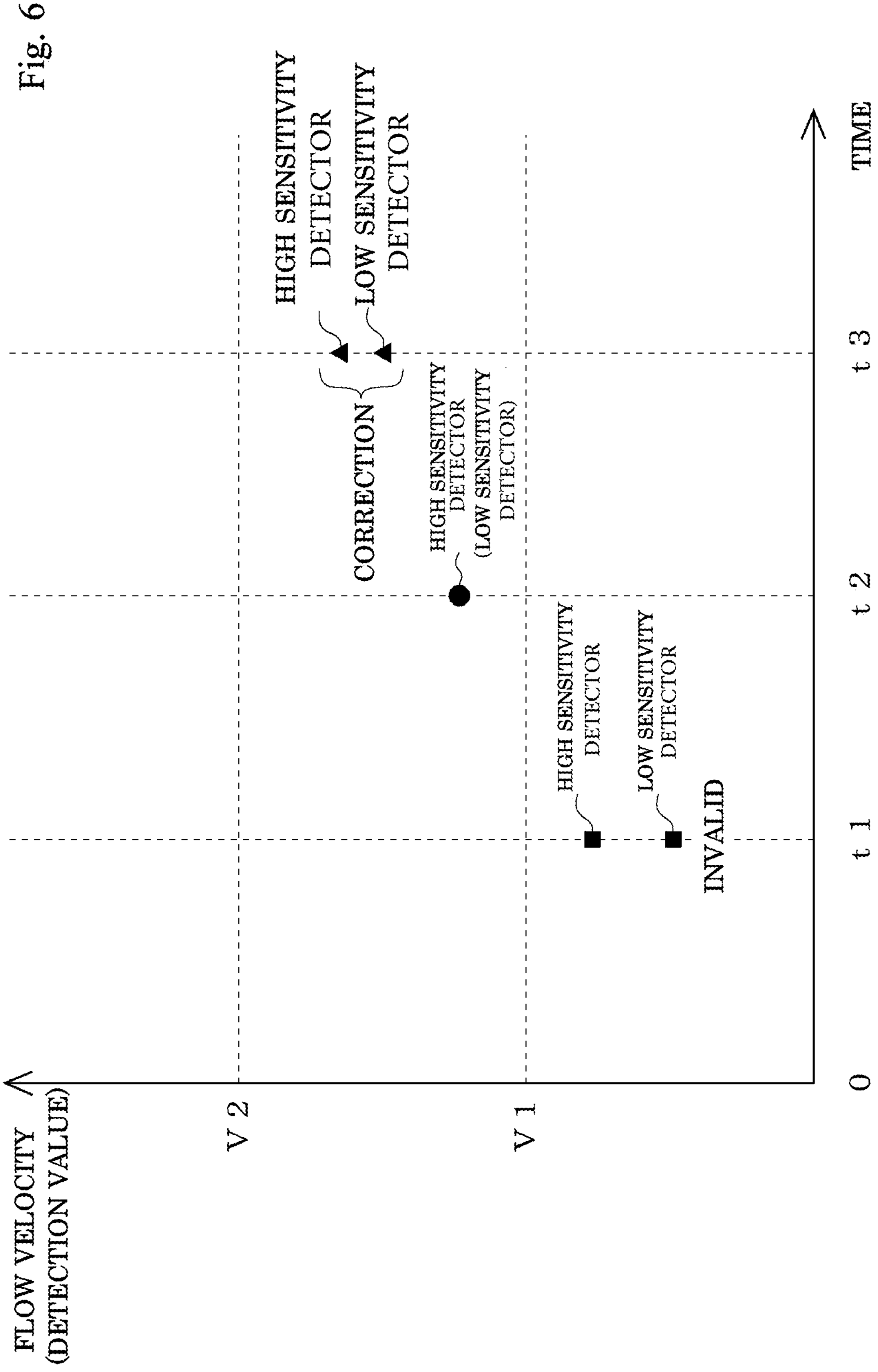
FIG. 6 is a graph illustrating an example of a detection result of a flow velocity.

The graph illustrated in FIG. 6 shows a detection result (flow velocity) of the detector 100 (the high sensitivity detector 200 and the low sensitivity detector 300) at a certain time. In the present example embodiment, the server 40 acquires detection results of times t1, t2, and t3 at predetermined time intervals (for example, intervals of 15 minutes). Note that the time intervals are not limited to the example described above, and various time intervals can be adopted.

Furthermore, the server 40 corrects the detection result as necessary on the basis of the detection value at each time of the flow velocity sensor 10.

FIG. 6 illustrates that flow velocities detected by the high sensitivity detector 200 and the low sensitivity detector 300 at the time t1 are in a flow velocity range of less than V1. As described above, in the flow velocity range of less than V1, it is difficult for the low sensitivity detector 300 to detect an accurate detection value (see FIGS. 4A to 4C and 5). Therefore, in the flow velocity range of less than V1, the server 40 invalidates the detection result of the low sensitivity detector 300 among the detection results, and acquires the flow velocity on the basis of the detection result of the high sensitivity detector 200. Note that, in this case, the detection result is not corrected.

Furthermore, FIG. 6 illustrates that the flow velocities detected by the high sensitivity detector 200 and the low sensitivity detector 300 at the time t2 and the time t3 are in a flow velocity range of V1 or more and less than V2.

Here, in a case where the detection results of the high sensitivity detector 200 and the low sensitivity detector 300 indicate that the flow velocity is V1 or more and less than V2, the server 40 determines the necessity of correction of the detection result on the basis of each detection result.

Specifically, in a case where the high sensitivity detector 200 is plastically deformed as described above, there is a difference between the detection result of the high sensitivity detector 200 and the detection result of the low sensitivity detector 300. In a case where the difference between the detection results is greater than or equal to a predetermined range, the server 40 determines that an error has occurred. In this case, the server 40 determines that the detection value needs to be corrected. The predetermined range can be set on the basis of, for example, a ratio (%) of a difference between the detection results to the detection result of the low sensitivity detector 300.

FIG. 6 illustrates an example in which the flow velocities detected by the high sensitivity detector 200 and the low sensitivity detector 300 at the time t2 substantially coincide with each other, and a difference between the flow velocities is within the predetermined range. In this case, the server 40 determines that the detection value does not need to be corrected, and acquires the flow velocity on the basis of the detection results of the high sensitivity detector 200 and the low sensitivity detector 300. Note that, in this case, the server 40 may acquire the flow velocity using only one detection result of the detection results of the high sensitivity detector 200 and the low sensitivity detector 300, or may acquire the flow velocity using both the detection results (for example, calculating an average value of both detection results).

Furthermore, FIG. 6 illustrates an example in which a difference between the flow velocities detected by the high sensitivity detector 200 and the low sensitivity detector 300 at the time t3 is greater than or equal to a predetermined range. That is, in the example illustrated in FIG. 6, it is considered that the flow velocity in the pipe becomes V2 or more from the time t2 to the time t3, and plastic deformation occurs in the main body 210 of the high sensitivity detector 200. In this case, the server 40 determines that the detection value needs to be corrected and corrects the detection value.

In the case of determining that the detection value needs to be corrected, the server 40 notifies an administrator, a user, or the like of the management system 1 that correction processing is to be performed by an input/output device such as a display. The notification is not limited to the input/output device, and can be executed by, for example, an appropriate terminal.

In the correction processing, the server 40 calculates, as a measurement error, plastic strain that is a difference between the detection value of the high sensitivity detector 200 before plastic deformation and the detection value of the high sensitivity detector 200 after plastic deformation illustrated in FIG. 5.

The measurement error can be calculated by various methods. For example, in the flow velocity range of V1 or more and less than V2, since the detection result of the low sensitivity detector 300 is considered to be substantially accurate, a difference between the detection results of the low sensitivity detector 300 and the high sensitivity detector 200 in the flow velocity range can be calculated as a measurement error. Furthermore, in addition, a difference between the detection results of the high sensitivity detector 200 before and after plastic deformation (see FIG. 5) can be calculated as a measurement error.

Next, the server 40 subtracts the measurement error from the detection value of the high sensitivity detector 200 after the plastic deformation. As a result, the detection result of the high sensitivity detector 200 is corrected. A detection result of the high sensitivity detector 200 after the correction is shown in tx and subsequent times of FIG. 4C. The corrected detection value substantially matches the actual flow velocity.

As described above, in the present example embodiment, in the flow velocity range (flow velocity range of V1 or more and less than V2) in which both the high sensitivity detector 200 and the low sensitivity detector 300 can detect accurate detection values, the difference (measurement error) between the detection values can be acquired, and the detection value of the high sensitivity detector 200 can be corrected by the measurement error. By performing the above correction, even in a case where the deformation portion 212 is plastically deformed, it is possible to continue the detection of the flow velocity using the high sensitivity detector 200.

Furthermore, in a case where the deformation portion 212 is plastically deformed again after the correction, the server 40 repeatedly performs the correction.

Note that the flow velocity measurement method described above is an example, and the flow velocity measurement method using the flow velocity sensor 10 is not limited to the example described above. For example, in the above-described example, an example has been described in which the server 40 acquires the detection results at the times t1, t2, and t3 at predetermined time intervals, but the present invention is not limited to such an aspect, and the server 40 may be configured or programmed to constantly acquire the detection results.

As described above, the flow velocity sensor 10 according to the present example embodiment is a flow velocity sensor 10 to detect a flow velocity of a fluid in a pipe (water in the water pipe 2), the flow velocity sensor including a detector 100 including a main body (the main body 210 and the main body 310) that is deformable by receiving pressure of the fluid, and a sensor (the sensor 220 and the sensor 320) to detect a deformation amount of the main body (the main body 210 and the main body 310), in which the main body (the main body 210 and the main body 310) includes a deformation portion (the deformation portion 212 and the deformation portion 312) provided with the sensor (the sensor 220 and the sensor 320), and a pressure receiving portion (the pressure receiving portion 213 and the pressure receiving portion 313) that receives pressure of the fluid and deforms the deformation portion (the deformation portion 212 and the deformation portion 312), the detector 100 includes a high sensitivity detector 200 and a low sensitivity detector 300, and a ratio of a pressure receiving area of the pressure receiving portion 213 of the high sensitivity detector 200 to a rigidity of the deformation portion 212 of the high sensitivity detector 200 is larger than a ratio of a pressure receiving area of the pressure receiving portion 313 of the low sensitivity detector 300 to a rigidity of the deformation portion 312 of the low sensitivity detector 300.

With this configuration, the flow velocity of the fluid can be detected in a wide flow velocity range. That is, in a case where the flow velocity of the fluid is small, the flow velocity can be detected using the high sensitivity detector 200 that is relatively easily deformed and suitable to detect a low flow velocity. Furthermore, in a case where the flow velocity of the fluid is large, the flow velocity can be detected using the low sensitivity detector 300 that is relatively hardly deformed and suitable to detect a high flow velocity. As described above, by using the high sensitivity detector 200 and the low sensitivity detector 300, the flow velocity of the fluid can be detected in a wide flow velocity range.

Furthermore, the main body 210 of the high sensitivity detector 200 and the main body 310 of the low sensitivity detector 300 each have a plate shape and are disposed side by side in a plate surface direction. With this configuration, the flow velocity sensor 10 can be downsized. That is, by disposing the plate-shaped high sensitivity detector 200 and low sensitivity detector 300 side by side in the plate surface direction, the dimension in a plate thickness direction can be reduced.

Furthermore, the flow velocity detection method according to the present example embodiment is a flow velocity detection method of detecting a flow velocity of the fluid based on a detection result by the sensor (the sensor 220 and the sensor 320) using the flow velocity sensor 10, the flow velocity detection method including correcting a detection result of the sensor 220 of the high sensitivity detector 200 with a detection result of the sensor 320 of the low sensitivity detector 300 to detect a flow velocity of the fluid.

With this configuration, the flow velocity of the fluid can be accurately detected.

That is, it is conceivable that the high sensitivity detector 200 that is relatively easily deformed plastically deforms when the flow velocity of the fluid becomes higher than expected, but in this case, by correcting the detection result of the high sensitivity detector 200 using the detection result of the low sensitivity detector 300, the flow velocity can be accurately detected even after the plastic deformation.

Note that the configuration of the detector 100 (the high sensitivity detector 200 and the low sensitivity detector 300) of the flow velocity sensor 10 is not limited to the above-described example. Hereinafter, each modification of the detector 100 will be described with reference to FIGS. 7A to 7C.

Each modification described below is different from the detector 100 in that the thickness dimensions of the main body 210 of the high sensitivity detector 200 and the main body 310 of the low sensitivity detector 300 are the same.

Figure 7C:
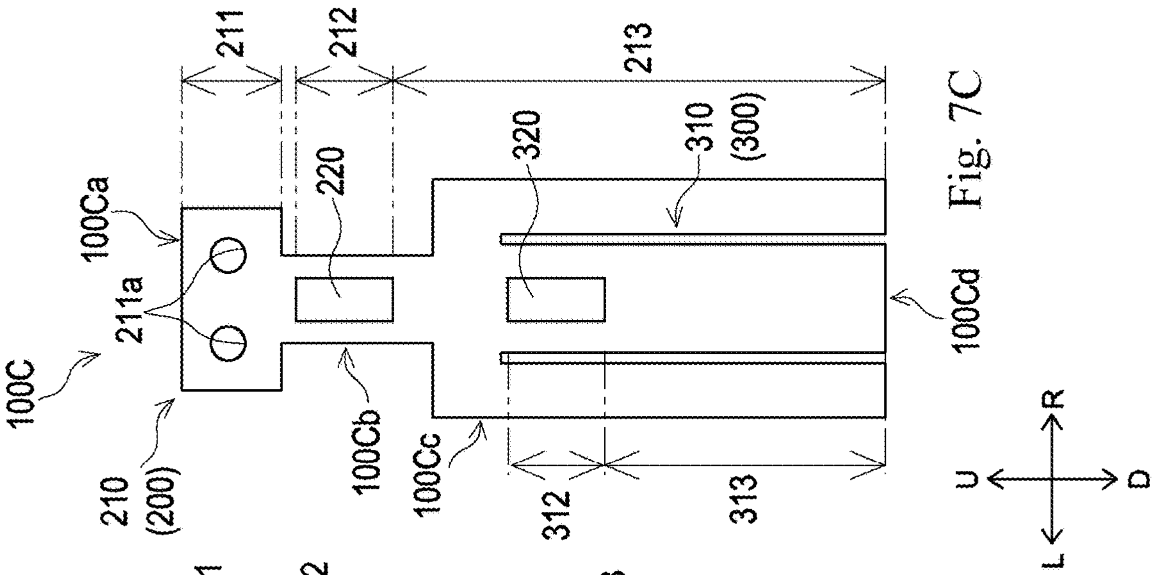
FIG. 7C is a front view of a third modification of the flow velocity sensor.
Figure 7B:
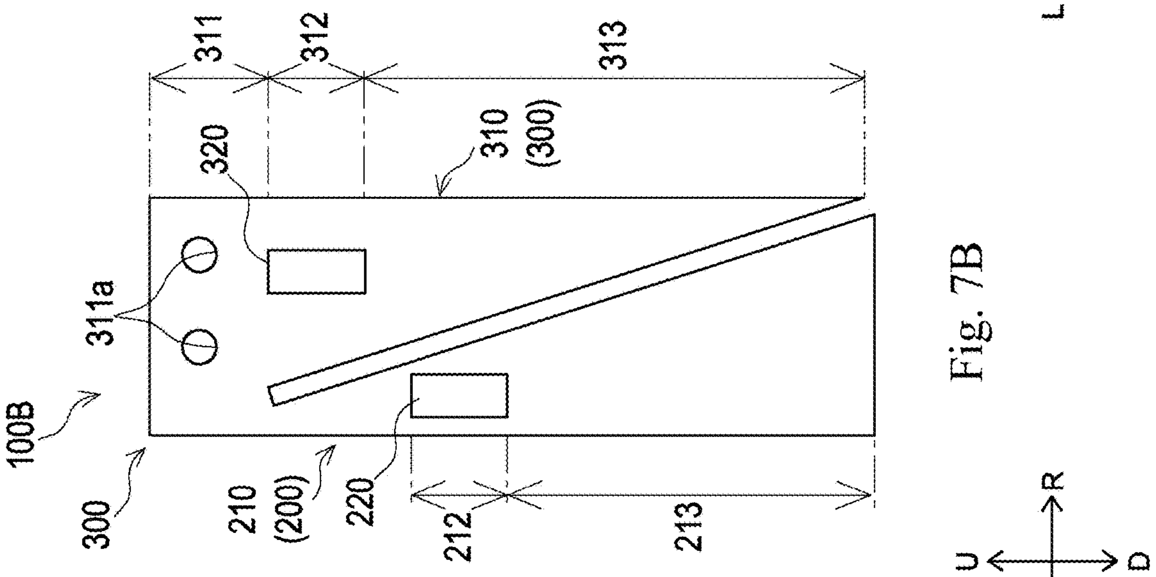
FIG. 7B is a front view of a second modification of the flow velocity sensor.
Figure 7A:
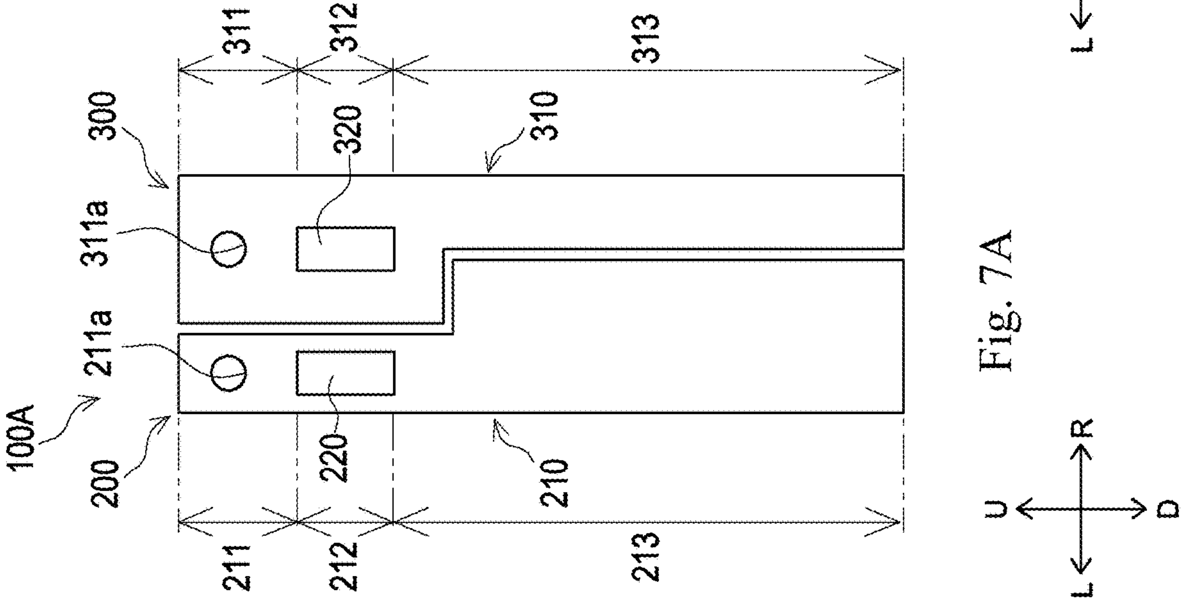
FIG. 7A is a front view of a first modification of the flow velocity sensor.

In a detector 100A according to a first modification illustrated in FIG. 7A, the main body 210 and the main body 310 are formed by dividing one plate-shaped structure into left and right portions. Specifically, the main body 210 has a larger width dimension (horizontal dimension) at a lower portion than at an upper portion, and the main body 310 has a larger width dimension at an upper portion than at a lower portion. The upper portion of the main body 210 and the lower portion of the main body 310 have the same width dimension, and the lower portion of the main body 210 and the upper portion of the main body 310 have the same width dimension.

In the detector 100A, the sensor 220 and the sensor 320 are provided on the upper portions of the main bodies (the main body 210 and the main body 310). That is, the upper portion of each main body corresponds to the deformation portion 212 and the deformation portion 312. Therefore, the width dimension of the deformation portion 212 is smaller than the width dimension of the deformation portion 312. Therefore, the rigidity of the deformation portion 212 is smaller than the rigidity of the deformation portion 312.

Furthermore, in the detector 100A, the pressure receiving portion 213 and the pressure receiving portion 313 are provided below the main body 210 and the main body 310. Therefore, a width dimension of the pressure receiving portion 213 is larger than a width dimension of the pressure receiving portion 313. Therefore, a pressure receiving area of the pressure receiving portion 213 is larger than a pressure receiving area of the pressure receiving portion 313.

Also in the detector 100A as described above, a ratio of the pressure receiving area of the pressure receiving portion 213 to the rigidity of the deformation portion 212 is larger than a ratio of the pressure receiving area of the pressure receiving portion 313 to the rigidity of the deformation portion 312. Therefore, the detector 100A has substantially the same effect as the detector 100.

Furthermore, as illustrated in FIG. 7A, in the detector 100A, the width dimension of the upper portion of the main body 210 is smaller by the increase in the width dimension of the upper portion of the main body 310, the width dimension of the lower portion of the main body 310 is smaller by the increase in the width dimension of the lower portion of the main body 210, and both structures are combined to form a rectangular shape as a whole in a front view. Thus, the detector 100A can be made compact in the width direction.

In a detector 100B according to a second modification illustrated in FIG. 7B, a slit is formed in one plate-shaped structure to provide the main body 210 and the main body 310. Specifically, the main body 210 and the main body 310 divided into the left and right portions are formed by forming a slit extending diagonally from a lower right corner of the plate-shaped structure in front view. Furthermore, the detector 100B has a common fixing portion 311.

In the detector 100B, the width dimension of the main body 210 on the left side is larger toward the lower side. On the other hand, the width dimension of the main body 310 on the right side is smaller toward the lower side. In the detector 100B, the sensor 220 and the sensor 320 are provided on upper portions of the main bodies (the main body 210 and the main body 310). That is, an upper portion of each of the main bodies corresponds to the deformation portion 212 and the deformation portion 312, and a portion below each of the deformation portions corresponds to the pressure receiving portion 213 and the pressure receiving portion 313.

In the detector 100B, since the width dimension of the deformation portion 212 is smaller than the width dimension of the deformation portion 312, the rigidity of the deformation portion 212 is smaller than the rigidity of the deformation portion 312. Furthermore, the detector 100B receives a water pressure in lower portions of the pressure receiving portion 213 and the pressure receiving portion 313. Since the width dimension of the lower portion of the pressure receiving portion 213 is larger than the width dimension of the lower portion of the pressure receiving portion 313, the pressure receiving area of the pressure receiving portion 213 is larger than the pressure receiving area of the pressure receiving portion 313.

Also in the detector 100B as described above, a ratio of the pressure receiving area of the pressure receiving portion 213 to a rigidity of the deformation portion 212 is larger than a ratio of the pressure receiving area of the pressure receiving portion 313 to a rigidity of the deformation portion 312. Therefore, the detector 100B has substantially the same effect as the detector 100.

Furthermore, as illustrated in FIG. 7B, in the detector 100B, the high sensitivity detector 200 and the low sensitivity detector 300 are integrally formed. Therefore, workability such as attachment and detachment of the detector 100B can be improved.

A detector 100C according to a third modification illustrated in FIG. 7C is formed by forming an appropriate notch or the like in one plate-shaped structure. Specifically, in the detector 100C, a narrow portion 100Cb having a smaller width dimension than an upper end portion 100Ca is formed below the upper end portion 100Ca defining the common fixing portion 211. Furthermore, in the detector 100C, a wide portion 100Cc having a larger width dimension than the upper end portion 100Ca is provided below the narrow portion 100Cb. In the wide portion 100Cc, a pair of slits extending upward from a lower end portion and positioned at intervals in the left-right direction are provided. By forming the pair of slits, a central portion 100Cd is provided between the slits. A width dimension of the central portion 100Cd is the same as a width dimension of the narrow portion 100Cb.

In the detector 100C, the sensor 220 is provided in the narrow portion 100Cb. That is, a portion of the narrow portion 100Cb where the sensor 220 is provided corresponds to the deformation portion 212. Furthermore, in the detector 100C, a portion below the deformation portion 212 (a portion including the entire wide portion 100Cc) corresponds to the pressure receiving portion 213.

Furthermore, in the detector 100C, the sensor 320 is provided in the central portion 100Cd. That is, a portion of the central portion 100Cd where the sensor 320 is provided corresponds to the deformation portion 312. Furthermore, in the detector 100C, a portion below the deformation portion 312 corresponds to the pressure receiving portion 313. That is, in the detector 100C, the main body 310 (the deformation portion 312 and the pressure receiving portion 313) of the low sensitivity detector 300 is included in the pressure receiving portion 213 of the main body 210 of the high sensitivity detector 200.

In the detector 100C, the width dimension of the deformation portion 212 and the width dimension of the deformation portion 312 are the same. Furthermore, a pressure receiving area of the pressure receiving portion 213 is larger than a pressure receiving area of the pressure receiving portion 313.

Also in the detector 100C as described above, a ratio of the pressure receiving area of the pressure receiving portion 213 to a rigidity of the deformation portion 212 is larger than a ratio of the pressure receiving area of the pressure receiving portion 313 to a rigidity of the deformation portion 312. Therefore, the detector 100C has substantially the same effect as the detector 100.

Furthermore, as illustrated in FIG. 7C, in the detector 100C, the high sensitivity detector 200 and the low sensitivity detector 300 are integrally formed. Therefore, workability such as attachment and detachment of the detector 100C can be improved.

Furthermore, a second example embodiment of the present invention of the present application will be described below.

In the first example embodiment described above, as illustrated in FIG. 2, the high sensitivity detector 200 and the low sensitivity detector 300 are disposed side by side in the left-right direction. However, as in the second example embodiment illustrated in FIGS. 8 and 9A to 9C, a high sensitivity detector 200 and a low sensitivity detector 300 may be disposed in the front-rear direction.

Figure 8:
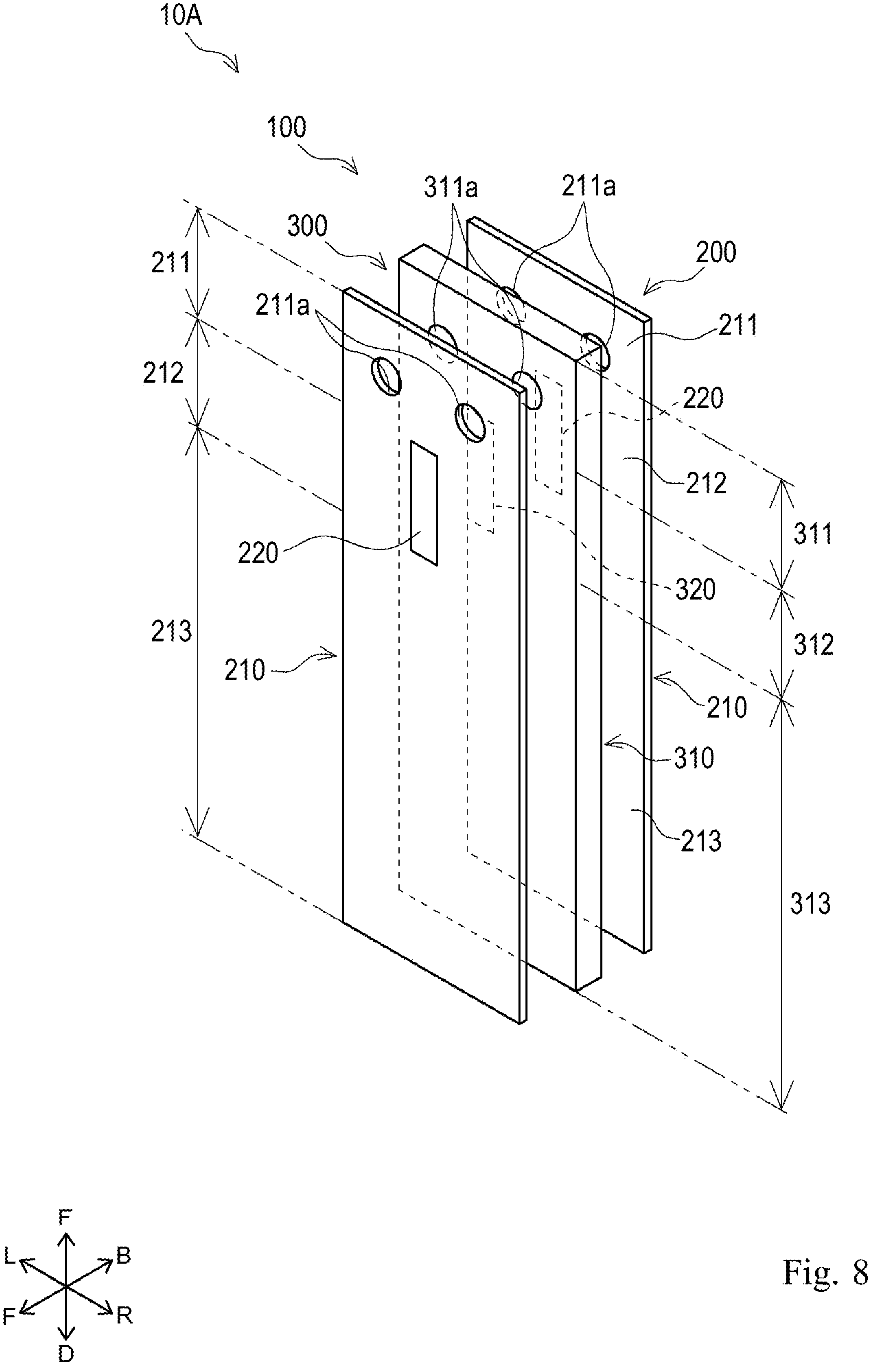
FIG. 8 is a perspective view of a flow velocity sensor according to a second example embodiment of the present invention.

As illustrated in FIG. 8, in a flow velocity sensor 10A according to the second example embodiment of the present invention, a pair of the front and rear high sensitivity detectors 200 is disposed so as to sandwich the low sensitivity detector 300. Note that the high sensitivity detectors 200 and the low sensitivity detector 300 of the flow velocity sensor 10A are substantially similar to the high sensitivity detector 200 and the low sensitivity detector 300 of the flow velocity sensor 10 according to the first example embodiment.

A predetermined gap is formed between each of the high sensitivity detectors 200 and the low sensitivity detector 300. The predetermined gap is formed such that the high sensitivity detector 200 can come into contact with the low sensitivity detector 300 while a deformation amount of the high sensitivity detector 200 is within an elastic range without the facing sensors (sensor 220 and sensor 320) coming into contact with each other (see FIGS. 9B and 9C). The gap can be formed, for example, by disposing a spacer between the high sensitivity detector 200 and the low sensitivity detector 300.

Figures 9A, 9B, 9C:
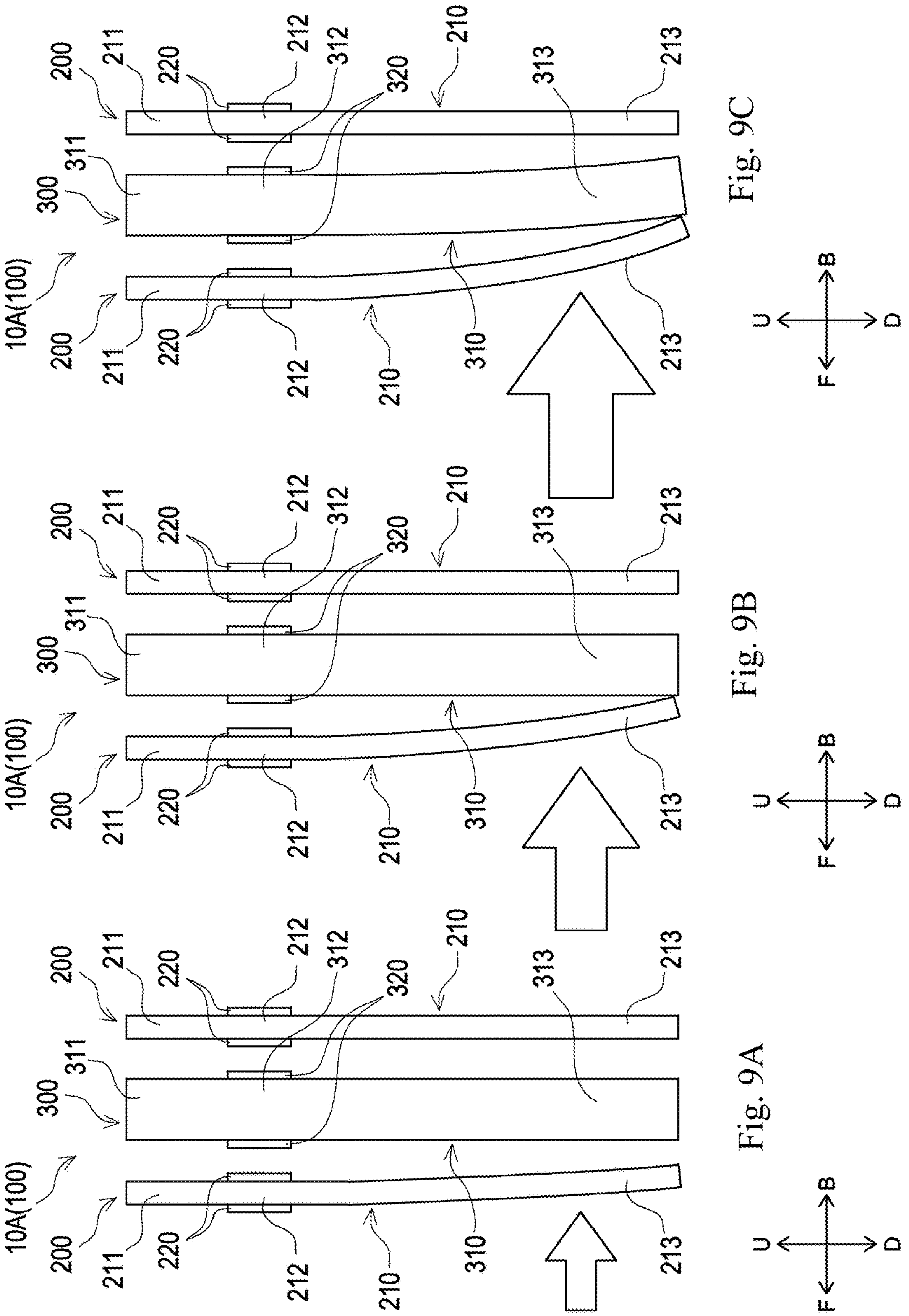
FIG. 9A is a side view illustrating a state of the flow velocity sensor in a state where the flow velocity is less than V1.
FIG. 9B is a side view illustrating a state of the flow velocity sensor in a state where the flow velocity is V1.
FIG. 9C is a side view illustrating a state of the flow velocity sensor in a state where the flow velocity is V2 or more.

As illustrated in FIG. 9A, in a case where a flow velocity of water in a water pipe 2 is relatively small, a main body 210 (on an upstream side) that receives the water pressure of the pair of high sensitivity detectors 200 is deformed within the range of the gap from the low sensitivity detector 300. Furthermore, as illustrated in FIGS. 9B and 9C, in a case where the flow velocity is relatively large, the main body 210 comes into contact with a main body 310 of the low sensitivity detector 300. Furthermore, the main body 310 is deformed together with the main body 210 by receiving pressure through the main body 210.

Hereinafter, with reference to FIGS. 9A to 9C and 10, a flow velocity detection method by the flow velocity sensor 10A will be described for each different flow velocity. Specifically, the flow velocity detection method will be described with reference to a relatively small flow velocity V1 and a relatively large flow velocity V2.

Figure 10:
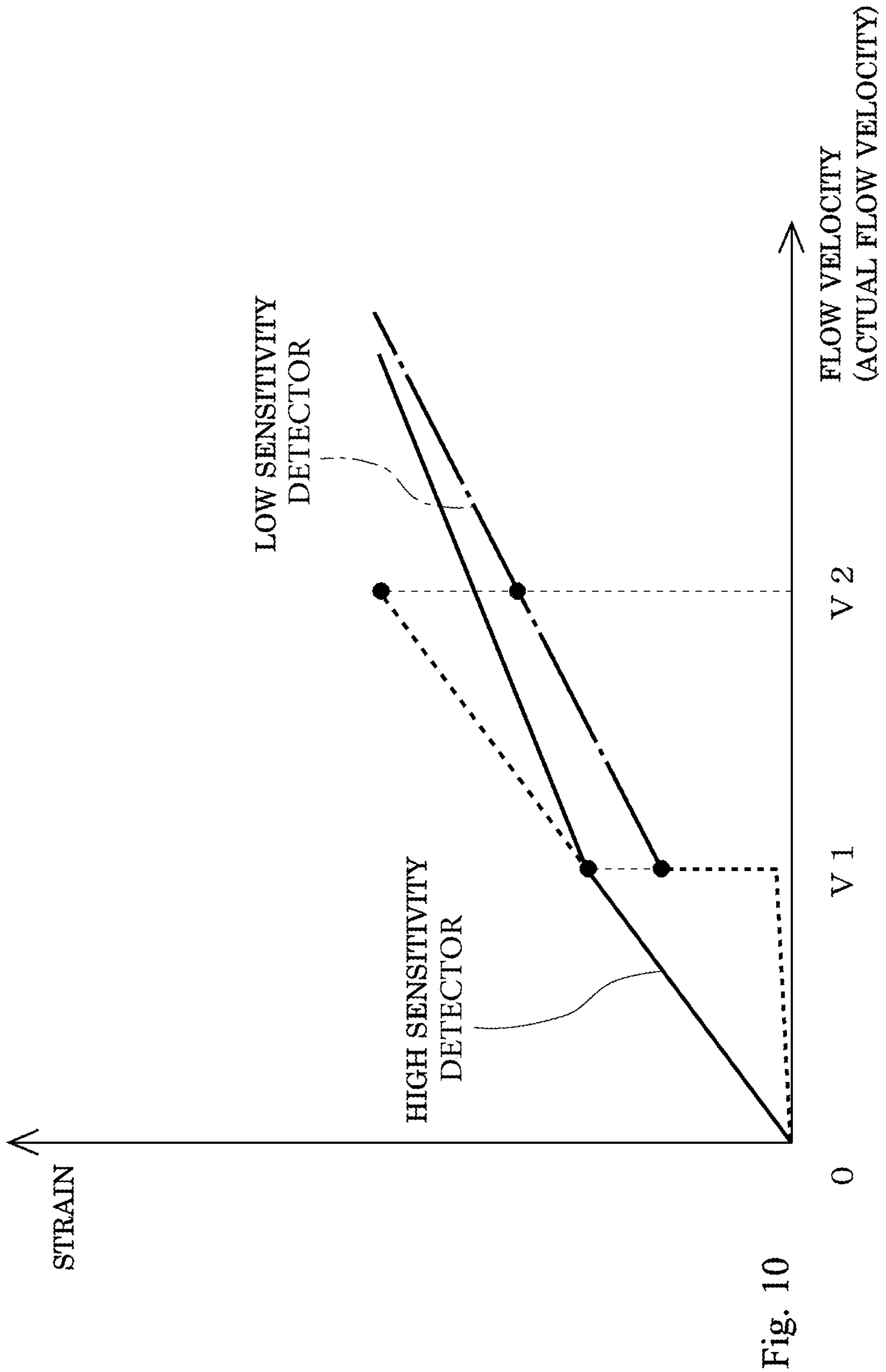
FIG. 10 is a graph illustrating a relationship between strain detected by a sensor and an actual flow velocity.

FIG. 9A illustrates a case where the flow velocity of water in the water pipe 2 is less than V1. In this state, since the pressure of water is small, the main body 210 of the high sensitivity detector 200 is deformed within the range of the gap from the low sensitivity detector 300. Note that, as illustrated in FIG. 10, the low sensitivity detector 300 is hardly deformed in a flow velocity range of less than V1. Therefore, in the flow velocity range of less than V1, the server 40 invalidates the detection result of the low sensitivity detector 300 and acquires the flow velocity on the basis of the detection result of the high sensitivity detector 200.

FIG. 9B illustrates a case where the flow velocity of water in the water pipe 2 is V1. In this state, the main body 210 comes into contact with the main body 310.

In a case where the flow velocity of water in the water pipe 2 is larger than V1 (for example, V2), as illustrated in FIG. 9C and FIG. 10, the main body 310 is deformed by being indirectly subjected to water pressure through the main body 210. In a flow velocity range larger than V1, the server 40 acquires the flow velocity on the basis of the detection result of the low sensitivity detector 300.

In the flow velocity sensor 10A as described above, when the high sensitivity detector 200 is deformed by a predetermined amount or more, it comes into contact with the low sensitivity detector 300 and the deformation is reduced or prevented, so that it is possible to prevent the high sensitivity detector 200 from being excessively deformed and plastically deformed.

Furthermore, in the present example embodiment, since the pair of high sensitivity detectors 200 is disposed so as to sandwich the low sensitivity detector 300 in the front-rear direction, it is possible to detect both the flow velocities in the front-back direction.

Note that, in the flow velocity sensor 10A, the shapes of the main body 210 and the main body 310 are similar to the shapes of the main body 210 and the main body 310 of the flow velocity sensor 10 according to the first example embodiment, but the present invention is not limited to such an aspect. For example, from the viewpoint of further improving the sensitivity of the high sensitivity detector 200, a width dimension of a deformation portion 212 of the main body 210 may be smaller than a width dimension of a pressure receiving portion 213. In addition, various shapes can be adopted as the shapes of the main body 210 and the main body 310.

Furthermore, also in the present example embodiment, the flow velocity may be acquired by correcting the detection result by the high sensitivity detector 200 with the detection result by the low sensitivity detector 300.

As described above, in the flow velocity sensor 10A according to the present example embodiment, a pair of the high sensitivity detectors 200 is disposed so as to sandwich the low sensitivity detector 300 in a flowing direction of the fluid, and a predetermined gap is provided between the high sensitivity detectors 200 and the low sensitivity detector 300.

With this configuration, it is possible to reduce or prevent plastic deformation of the high sensitivity detectors 200. That is, when the high sensitivity detectors 200 are deformed by a predetermined amount or more, the high sensitivity detectors come into contact with the low sensitivity detector 300 and the deformation is reduced or prevented, so that it is possible to prevent the high sensitivity detectors 200 from being excessively deformed and plastically deformed.

Although example embodiments of the present invention has been described above, the present invention is not limited to the above configurations or example embodiments, and various modifications can be made within the scope of the present invention.

For example, in each of the above example embodiments, an example in which the flow velocity sensor 10 (10A) is provided in the fire hydrant 4 has been described, but an installation target of the flow velocity sensor 10 (10A) is not limited to the fire hydrant 4, and can be applied to various facilities such as a valve.

Furthermore, in the above example embodiments, the example in which the sensor 220 and the sensor 320 are provided on both surfaces of the main body 210 and the main body 310 has been described, but example embodiments of the present invention are not limited to such configurations. For example, the sensor 220 and the sensor 320 may be provided only on one surface in the front-rear direction of the main body 210 and the main body 310.

Furthermore, in the second example embodiment, the example in which the sensor 220 and the sensor 320 are provided in both the high sensitivity detector 200 and the low sensitivity detector 300 has been described, but example embodiments of the present invention are not limited to such configurations. For example, the sensor 220 may be provided only in the high sensitivity detector 200, and the sensor 320 may not be provided in the low sensitivity detector 300. In this case, the server 40 acquires the flow velocity using only the detection value detected by the sensor 220.

Furthermore, in the above example embodiments, an example in which the main body 210 and the main body 310 of the flow velocity sensor 10 (10A) have a plate shape has been described, but the shapes of the main body 210 and the main body 310 are not limited to the plate shape, and can have any shape.

Furthermore, in the above example embodiments, the example in which the flow velocity sensor 10 (10A) is fixed to the attachment rod 6 has been described, but example embodiments of the present invention are not limited to such configurations. For example, flow velocity sensor 10 (10A) may be directly fixed to fire hydrant 4 without through attachment rod 6.

Furthermore, in the above example embodiments, the flow velocity sensor 10 (10A) detects the flow velocity of water in the water pipe 2, but example embodiments of the present invention are not limited to such configurations. The flow velocity sensor 10 (10A) can detect the flow velocity of the fluid in various pipes.

Example embodiments of the present invention and modifications or combinations thereof can be applied to flow velocity sensors to detect flow velocities of fluids in pipes and flow velocity detection methods using the flow velocity sensors.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A flow velocity sensor to detect a flow velocity of a fluid in a pipe, the flow velocity sensor comprising:
- a high sensitivity detector and a low sensitivity detector each including:
  - a main body that is deformable by receiving pressure of the fluid; and
  - a sensor to detect a deformation amount of the main body; wherein
- the main body includes:
  - a deformation portion provided with the sensor; and
  - a pressure receiving portion to receive pressure of the fluid and deform the deformation portion;
- the low sensitivity detector is configured to detect the flow velocity of the fluid with lower sensitivity than the high sensitivity detector;
- a ratio of a pressure receiving area of the pressure receiving portion of the high sensitivity detector to a rigidity of the deformation portion of the high sensitivity detector is larger than a ratio of a pressure receiving area of the pressure receiving portion of the low sensitivity detector to a rigidity of the deformation portion of the low sensitivity detector;
- a pair of the high sensitivity detectors is disposed so as to sandwich the low sensitivity detector in a flowing direction of the fluid; and
- a predetermined gap is provided between each of the high sensitivity detectors and the low sensitivity detector.

2. The flow velocity sensor according to claim 1, wherein the main body of the high sensitivity detector and the main body of the low sensitivity detector each have a plate shape and are disposed side by side in a plate surface direction.

3. A flow velocity detection method of, by using the flow velocity sensor according to claim 1, detecting the flow velocity of the fluid based on a detection result by the sensor, the flow velocity detection method comprising:
- correcting a detection result by the sensor of the high sensitivity detector with a detection result by the sensor of the low sensitivity detector to detect the flow velocity of the fluid.

4. A flow velocity detection method comprising:
- detecting a flow velocity of a fluid based on a detection result by a flow velocity sensor comprising:
  - a high sensitivity detector and a low sensitivity detector each including:
  - a main body that is deformable by receiving pressure of the fluid; and
  - a sensor to detect a deformation amount of the main body; wherein
  - the main body includes:
    - a deformation portion provided with the sensor; and
    - a pressure receiving portion to receive pressure of the fluid and deform the deformation portion;
  - the low sensitivity detector is configured to detect the flow velocity of the fluid with lower sensitivity than the high sensitivity detector; and
  - a ratio of a pressure receiving area of the pressure receiving portion of the high sensitivity detector to a rigidity of the deformation portion of the high sensitivity detector is larger than a ratio of a pressure receiving area of the pressure receiving portion of the low sensitivity detector to a rigidity of the deformation portion of the low sensitivity detector; and
  - correcting a detection result by the sensor of the high sensitivity detector with a detection result by the sensor of the low sensitivity detector to detect the flow velocity of the fluid.

* * * * *